Aug. 11, 1931.　　　　G. W. DELL　　　　1,818,945
DOUGH MOLDING MACHINE
Filed April 15, 1929　　3 Sheets-Sheet 1
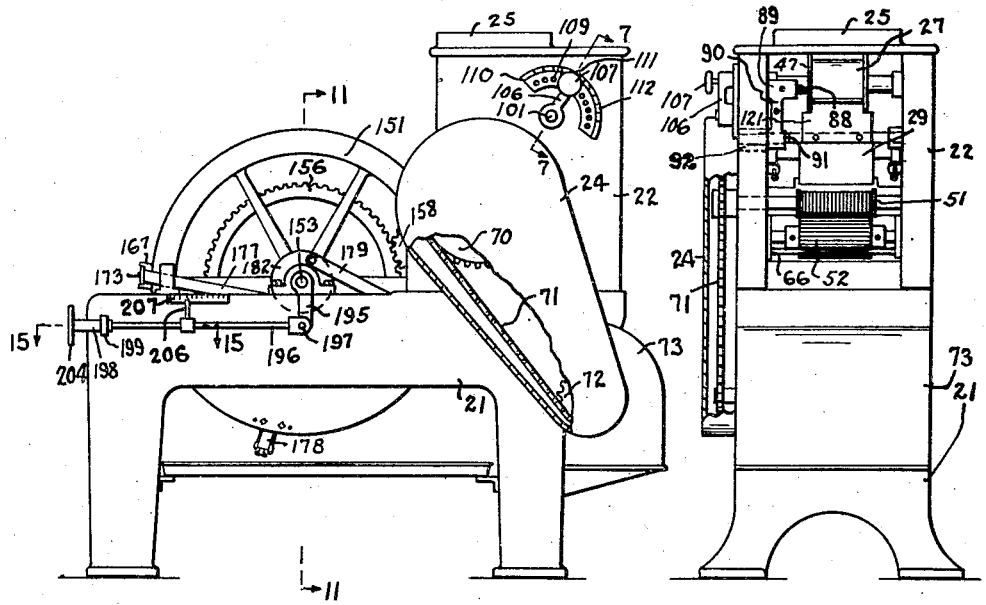
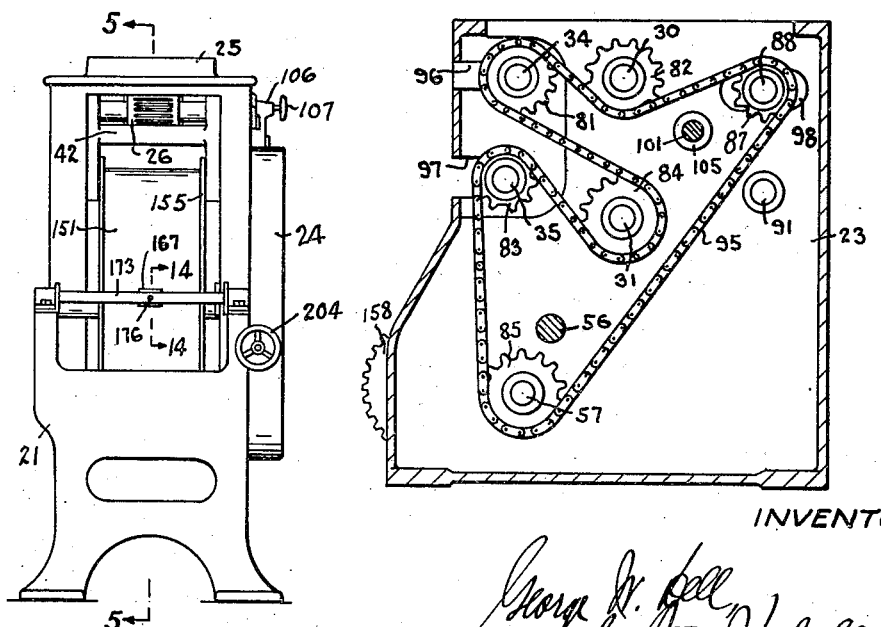
INVENTOR:

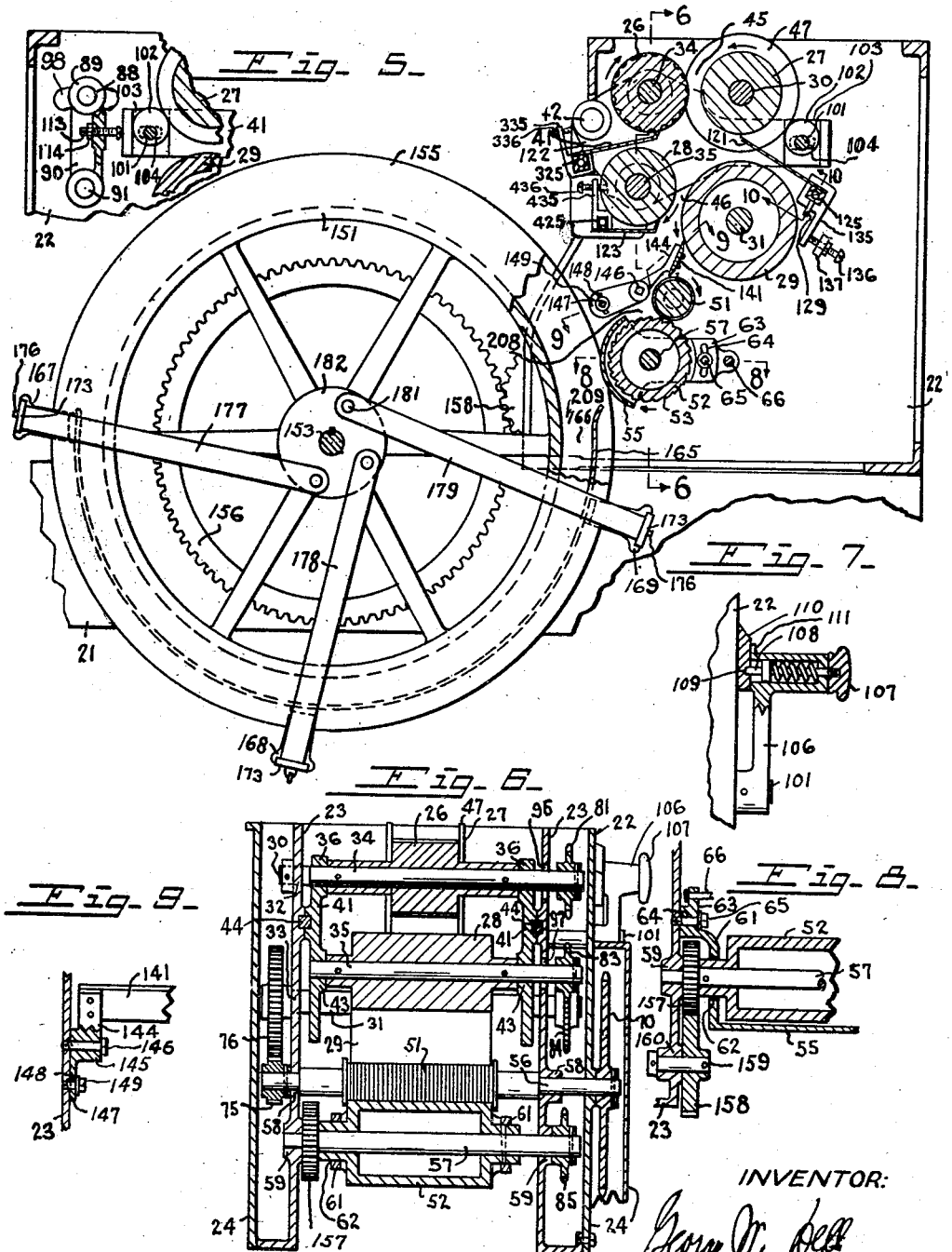

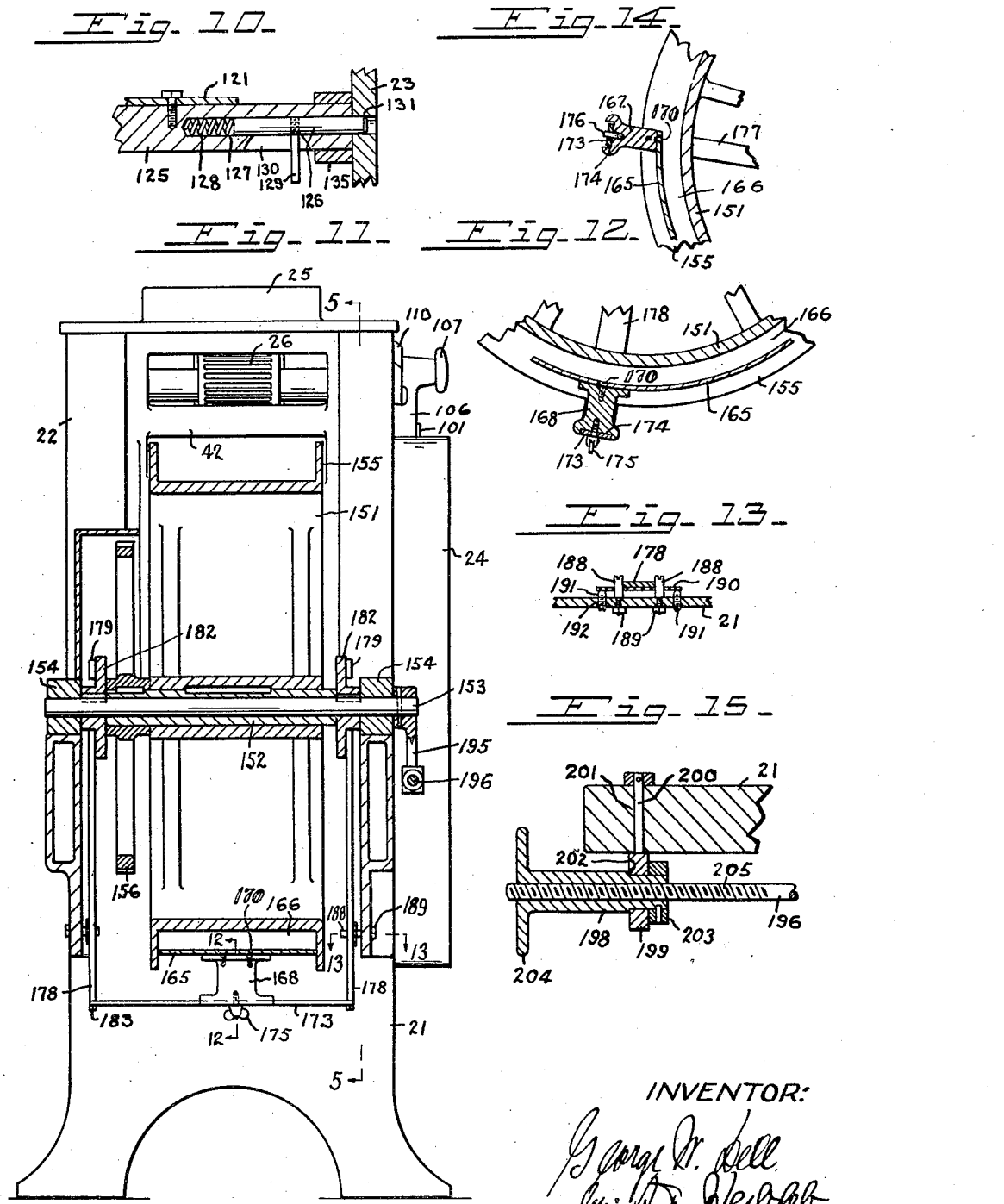

Patented Aug. 11, 1931

1,818,945

UNITED STATES PATENT OFFICE

GEORGE W. DELL, OF CHEVIOT, OHIO, ASSIGNOR TO THE TRIUMPH MANUFACTURING COMPANY, OF CINCINNATI, OHIO, A CORPORATION OF OHIO

DOUGH MOLDING MACHINE

Application filed April 15, 1929. Serial No. 355,186.

My invention relates to dough molding machines in which the dough is sheeted, coiled and rolled for forming a roll or loaf.

It is the object of my invention to provide new and improved means for adjusting the sheeting rolls; further, to provide new and improved means for adjusting the sheeting rolls and concurrently adjusting the driving means for the same, so as to maintain the driving relations in the driving means throughout the adjustments of distance between the sheeting rolls; further, to provide new and improved means for scraping the sheeting rolls; further, to provide new and improved means for mounting and adjusting the molding plate complemental to the rolling drum; and, further, to provide new and improved means for positioning the molding plate.

The invention will be further readily understood from the following description and claims, and from the drawings, in which latter:

Fig. 1 is a side elevation of my improved device, partly broken away.

Fig. 2 is an end view of the same, viewed from the feed-in end, partly broken away.

Fig. 3 is an end view of the same, viewed from the feed-out end.

Fig. 4 is a side elevation showing the driving means for the sheeting rolls, the gear cover-plate being removed.

Fig. 5 is a vertical section of my improved device, the sheeting and coiling means being shown in vertical section on the line 5—5 of Fig. 3, and the rolling means being shown partly in section in the plane of the line 5—5 of Fig. 11.

Fig. 5a is a detail view showing the adjustment for the arm of the tightening sprocket.

Fig. 6 is a vertical section of my improved device taken in the plane of the irregular line 6—6 of Fig. 5.

Fig. 7 is a sectional detail view, taken on the line 7—7 of Fig. 1.

Fig. 8 is a detail sectional view, taken in the plane of the line 8—8 of Fig. 5.

Fig. 9 is a sectional detail view, taken in the plane of the irregular line 9—9 of Fig. 5.

Fig. 10 is a sectional detail view taken in the plane of the line 10—10 of Fig. 5.

Fig. 11 is a vertical cross-section of my improved device, taken on the line 11—11 of Fig. 1.

Fig. 12 is a sectional detail view, taken in the plane of the line 12—12 of Fig. 11.

Fig. 13 is a sectional detail view, taken in the plane of the line 13—13 of Fig. 11.

Fig. 14 is a sectional detail view, taken on the line 14—14 of Fig. 3; and

Fig. 15 is a sectional detail view, taken on the line 15—15 of Fig. 1.

The frame of the machine is shown at 21 and comprises a roll housing 22 having side walls 23, provided with gear cover-plates 24. A hopper 25 is at the top of the roll housing. Sheeting rolls 26, 27, 28 and 29 are in the roll housing. The rolls 27 and 29 are exemplified as stationarily positioned in the roll housing, being fixed to shafts 30, 31, respectively journaled in bearings 32, 33, in the side walls of the roll housing. The roll 26 is exemplified as a fluted roll, the flutes extending only part way to the respective ends of the roll. The roll 26 is fixed to a shaft 34. The roll 28 is fixed to a shaft 35, the shaft 34 is journaled in bearings 36 of complemental slides 41. These slides are connected by a tubular cross-member 42 for forming a slide yoke. The shaft 35 is journaled in bearings 43 of said complemental slides.

The slides are slidable on guides 44 on the side walls of the roll housing. The slide-yoke is adjustable so as to adjust the distance between the rolls 26, 28, and the rolls 27, 29, respectively, whereby the depths of the passages 45, 46, between said rolls are adjusted, for adjusting the thickness to which the dough passing between said rolls is sheeted. The slide-yoke is adjustable along right lines for maintaining the relation of the depths of the passages 45, 46, throughout said adjustments.

The roll 27 is provided with end flanges 47 between which the roll 26 is received so as to form end walls for the passage 45 between the rolls 26, 27, throughout the adjustments of the roll 26.

A coiling roll 51 is located below the passage 46 and is complemental to a coiling roll 52 located therebelow. The coiling roll 51 is provided with circumferential ribs. The coiling roll 52 is provided with longitudinal teeth 53 for aiding in coiling the sheet of dough between said coiling rolls.

A shield 55 is received about the coiling roll 52 and is adjustable about the periphery of said coiling roll for adjusting the space between the upper edge of said shield and the coiling roll 51, for adjusting the angular exposure of the coiling roll 52 to the coil of dough being formed.

The coiling roll 51 is fixed to a shaft 56. The coiling roll 52 is fixed to a shaft 57. The shaft 56 is journaled in bearings 58 in the side walls 23. The shaft 57 is journaled in bearings 59 in said side walls.

The shield 55 is provided with side arms 61 having bearings 62 about the stubs of the roll 52. The side arms have extensions 63 beyond said bearings provided with slots 64. Bolts 65 provided with washers are received through said slots and are threaded into the side walls 23 for clamping the shield in adjusted positions. A handle-bar 66 is connected at its respective ends to the side arms 61 for manipulating the shield.

The shaft 56 has a gear 70 fixed thereto, shown as a sprocket-wheel, about which a sprocket chain 71 is received, which is also received about a sprocket pinion 72 on the rotor shaft of a suitable electric motor 73 mounted on the frame. The gear-cover 24 is received about said sprocket wheels and chain.

A pinion 75 is fixed to the shaft 56 and meshes with a gear 76 fixed to the shaft 31.

Gears 81, 82, 83, 84, 85, are fixed to the respective shafts 34, 30, 35, 31 and 57. A gear 87 rotates on a stud 88 fixed in a bearing 89 of an arm 90 pivoted on a stud 91 fixed in a bearing 92 in one of the side walls 23. A flexible driving member 95 is received about the gears 81, 82, 83, 84, 85 and 87. These gears are shown as sprocket wheels and the flexible driving member is shown as a sprocket chain. The shafts 34, 35, are received through slots 96, 97, in the side walls 23 and the stud 88 is received through a slot 98 in one of the side walls.

A rock-shaft 101 is provided with eccentrics 102 which are rotatable in slots 103 of the slides 41. This rock-shaft extends through slots 104 in the slides 41 and is journaled in bearings 105 in side walls 23. It has an arm 106 fixed thereto, provided with a handle 107, by means of which the arm is rocked for rocking the eccentrics and thereby adjusting the slides. The handle is provided with a spring-pressed pull-pin 108 arranged to be selectively received in holes 109 of an arc-piece 110, the arm being provided with a pointer 111 adapted to register with the markings of an index 112, to indicate to the operator the extent of adjustment of the passages between the sheeting rolls.

Means are provided for adjusting the flexible driving member 95 concurrently with the adjustments of the sheeting rolls for maintaining the driving relations of the rolls. For accomplishing this the arm 90 is shown provided with a set-screw 113 adjustable in said arm and provided with jam-nut 114, the set-screw engaging one of the slides so that the yoke is moved upon movement of the slides, thereby adjusting the gear 87 upon adjustment of the gears 81, 83.

Scrapers 121, 122, 123, are provided for the respective rolls 27, 26 and 28. These scrapers are mounted so as to be readily adjustable, and also so as to be readily removable for attention to and cleaning of the rolls and scrapers.

The mounting of the scraper 121 will be described. The mountings of the scrapers 122 and 123 are similar thereto, the parts being designated by similar reference numerals raised to the series 300 and 400 respectively.

The scraper 121 is mounted on a bar 125 to which it is fixed. A journal-stud 126 is provided for each end of the bar. The journal-stud is received in an end-socket 127 in the bar, and is spring pressed outwardly by a spring 128 between the bottom of said socket and the inner end of the stud.

A finger 129 is fixed to the stud and projects through a slot 130 in the bar to the outside of the bar, so that the fingers at the respective ends of the bar may be manipulated by the fingers of an operator for pressing the journal-studs inwardly, for permitting removal of the scraper. The journal-studs are received in bearings 131 in the side walls 23, between which the bar 125 is positioned endwise.

An arm 135 extends from the bar, at each end of the bar. A set-screw 136 is provided in a threaded lug 137 extending from the side wall 23 and coacts with said arm for adjusting the scraper with relation to the roll and determining the pressure of the scraper on the roll. The scrapers are preferably slightly resilient. The set-screw is released when the scraper is to be removed or replaced.

The screws 336 and 436 are threaded directly in the arms 335 and 435 respectively, and abut against lugs on the slide 41 at the respective sides of the machine.

A scraper-bar 141 is provided with scraper edges complemental to the peripheries of the rolls 29, 51. This scraper-bar is mounted on arms 144 provided with bearings 145 journaled on studs 146 fixed in the side walls 23. These arms are provided with extensions 147 having slots 148 in which bolts 149 are received, the bolts being threaded into the side walls for clamping the arms in adjusted positions for adjustably positioning the scraper edges of the scraper-bar 141 with relation to the rolls 29, 51.

A drum 151 rotates with a sleeve 152 journaled about a shaft 153 journaled in bearings 154 on the frame. The drum is provided with flanges 155. The sleeve has a gear 156 fixed thereto. A gear 157 is fixed to the shaft 57. The gear 157 meshes with a gear 158 on a shaft 159 journaled in a bearing 160 in one of the side frames 23. The gear 158 meshes with the gear 156 for rotating the drum 151.

An arcuate molding plate 165 is received about the drum 151 between the flanges 155. This molding plate is preferably resilient and is adjustable toward and from the periphery of the drum for determining the depth of the molding space 166 between the periphery of said drum and said plate, and determining the diameter to which the roll of dough shall be rolled. The outfeeding end of the molding plate is preferably slightly closer to the periphery of the drum than the infeeding end thereof so as to gradually reduce the depth of said molding space toward said outfeeding end.

This plate is a flexible plate and means are provided whereby, when the plate is adjusted toward and from the outer periphery of the drum, its curvature is also correspondingly varied for providing the desired space throughout the path of travel of the roll of dough about the drum.

The plate is provided with blocks 167, 168 and 169, respectively secured to said plate by fastening bolts 170 respectively at the middle portion and at the end portions of said plate. These blocks extend outwardly from the plate beyond the cylinders of the flanges 155, so that the plate may be moved inwardly and outwardly between the flanges 155 to the desired extent of adjustment. The resilient molding plate normally flexes outwardly.

Spanner bars 173 are preferably releasably secured to the blocks, as by being received in grooves 174 in the blocks. The middle one of the spanner bars is held to the middle one of the blocks by a wing bolt 175. The end ones of the spanner bars are pivotally held to the end ones of the blocks by pins 176 in the end blocks received in holes in the end spanner bars to permit yield between the end portions of the molding plate and said end blocks and flexing of the molding plate by the rolls of dough passing through the molding space between the drum and the molding plate.

Links 177, 178, 179, are at each end of the drum 151 and have their inner ends respectively pivoted about pivot studs 181, on disks 182, at the respective ends of the sleeve 152. The disks are secured to the shaft 153 so as to rotate therewith. The outer ends of these links are fixed to the respective spanner bars, as by means of bolts 183, for forming cradles in which the molding plate is received.

Means are provided for endwise holding the middle portion of the molding plate and also for laterally positioning the molding plate. Thus the respective side walls of the frame 21 are provided with shoulder screws 188 threaded through the side walls and clamped in place by nuts 189. These shoulder screws are located at the respective edges of the middle links 178 for maintaining the outer ends of said links against displacement lengthwise of the molding plate and positioning the middle portion of said molding plate lengthwise about the drum.

Plates 190 are provided with holes in which the screws 188 are received for supporting said plates. Adjusting bolts 191 are threaded in threaded holes 192 in the side walls of the main frame and are arranged to contact said plates for holding said plates inwardly, and preventing outward lateral displacement of the middle links 178. There is one of these plates complemental to each of these middle links at the respective sides of the machine for holding the molding plate 165 laterally between the flanges 155 and preventing undue edge scraping contact between said molding plate and said flanges.

An adjusting arm 195 is secured to the shaft 153. An adjusting rod 196 is articulated with said arm by a pin 197. An adjusting nut 198 is journaled in a bearing 199 pivoted by a stem 200 in a bearing 201 in the side wall of the frame. The adjusting nut is held endwise in said bearing between a shoulder 202 on said nut and a collar 203 fixed to said nut. Said nut is provided with a hand-wheel 204. The adjusting rod is provided with a threaded portion 205 at its outer end, which is threaded in the nut.

Rotation of the handle rotates the nut and thereby moves the adjusting rod endwise for rotating the shaft 153, and thereby rotating the disks 182 for adjusting the distance of the molding plate 165 with relation to the periphery of the drum 151. The respective links move substantially radially during such adjustment for equalizing the distance of the molding plate with relation to the periphery of the drum throughout the length of the molding plate. The pivot-studs 181 are located in a circle of small diameter described about the axis of rotation of the drum 151, and the links are normally tangent to said circle. The pivot-studs 181 are instanced as located on the disks 182. The disks include any equivalent means for positioning said studs relatively to the axis of the shaft 153.

The adjusting rod 196 is provided with an indicating finger 206 registering with the markings of an index 207, for indicating the depth of the space between the resilient molding plate and the periphery of the drum during the adjustment.

In operation, a ball of dough of predetermined weight, which is to form the roll or loaf of bread, is placed in the hopper 25 and drops between the sheeting rolls 26, 27, which initially sheet the ball of dough. The sheet of dough is then fed between the sheeting rolls 28, 29, between which it is further sheeted for extending its area and making a thinner sheet of dough.

The adjustment of the sheeting rolls 26, 28, toward and from the sheeting rolls 27, 29, determines the thickness of the sheet of dough, which adjustment is made by adjustment of the slide-yoke 41 by means of the adjusting arm 106, which rocks the rock-shaft 101 and the eccentrics 102. This adjustment at the same time rocks the arm 90, whereby the stud 88 is rocked and the sprocket-wheel 87 thereon moved toward and from the relatively stationary sprocket wheels 82, 84, for compensating for the distance of the sprocket wheels 81, 83, from the sprocket wheels 82, 84, and maintaining proper driving relation between the driving means for the rolls in the roll housing.

The scrapers 121, 122, 123, maintain the rolls 29, 26, 28, free from dough and prevent the sheet of dough traveling about said rolls. The directions of rotation of the rolls are indicated by the direction of the arrows in Fig. 5.

The sheet of dough next passes along the scraper bar 141 to the coiling roll 51 and the coiling roll 52 and is coiled in the coiling pocket 208 between said rolls.

The shield 55 permits the dropping of the coiled roll of dough out of said coiling pocket. The shield is adjusted according to the desired diameter of the coil of dough. When the coil of dough becomes of such diameter or weight as to be overbalanced toward the shield, the coil of dough will drop along said shield into the mouth 209 of the molding space 166 between the molding plate 165 and the drum.

The coil of dough is then rolled by the drum between said drum and the molding plate so as to thoroughly roll the dough into a homogeneous mass. The ends of the roll of dough will contact and be rubbed upon the flanges 155. The outer surface of the entire roll of dough is therefore provided with the desired skin of dough.

The adjustment of the hand wheel 204 adjusts the molding plate and controls the depth of space between the supporting plate and the sheave. This adjustment is complemental to the adjustment of the sheeting rolls and the shield 55, and is determined by the diameter of the loaf it is desired to roll.

The roll of dough is also compressed and extended in the molding space between the drum and the molding plate, aided by the contraction of this space toward the feeding-out end of said space.

The rolls of dough are a short distance apart in said space and are rolled rapidly through said space.

The resilience of the molding plate and the pivotal mounting of the ends of the molding plate permit the molding plate to resiliently yield to excess pressure by the rolls of dough, for instance, when said rolls of dough are of excess diameters. Under such circumstances the molding plate is permitted to bulge outwardly, which also draws the end or ends of the molding plate endwise toward the middle portion of the plate, the reflexing of the molding plate causing opposite movements which react on the rolls of dough in the molding space.

These movements of the molding plate may be described as wavings of the molding plate, and materially aid the passage of the rolls of dough through the molding space, and aid in the homogeneous molding of the dough.

The molding plate is removable by releasing the bolt 175, so that the molding plate and drum may be cleaned and given other attention.

Having thus fully described my invention, what I claim as new, and desire to secure by Letters Patent, is:

1. In a dough molding machine, the combination of opposed sheeting rolls, gearing for driving said sheeting rolls comprising a looped flexible driving member and gears therefor on said respective rolls and an adjustable gear in the loop of said flexible driving member, and adjusting means for adjusting the distance between said opposed sheeting rolls having connection with said last-named gear for simultaneously adjusting said last-named gear with said adjustment of said distance.

2. In a dough molding machine, the combination of stationarily positioned sheeting rolls, complemental sheeting rolls, a slide on which said complemental sheeting rolls are mounted, gears on said respective rolls, an adjustable gear, a flexible driving member connecting said gears, means for adjusting said slide, and connecting means between said slide and said adjustable gear for simultaneously adjusting said complemental rolls and said adjustable gear.

3. In a dough molding machine, the combination of stationarily positioned sheeting rolls, complemental adjustable sheeting rolls, a coiling roll, gears on said respective rolls, an idler gear, a flexible driving member received about said first-named gears and said idler gear, a slide on which said complemental sheeting rolls are mounted, and operative connecting means between said slide and said idler gear for simultaneously adjusting said complemental sheeting rolls and said idler gear whereby to maintain substantially equal driving relations between all said gears throughout the adjustments of said complemental sheeting rolls.

4. In a dough molding machine, the combination of a roll housing, sheeting rolls journaled therein, a slide in said housing, complemental sheeting rolls journaled in said slide, coiling rolls mounted in said housing, a pivoted arm, an idler gear journaled on said arm, gears for said respective sheeting rolls and a coiling roll, a flexible driving member received about all said gears for driving the same, means for adjusting said slide whereby to adjust said complemental sheeting rolls with relation to said first-named sheeting rolls, and connecting means between said pivoted arm and said slide for adjusting said idler gear by means of said slide and thereby maintaining substantially equal driving relations between said flexible driving member and all said gears throughout the adjustments of said slide.

5. In a dough molding machine, the combination of a roll housing, sheeting rolls mounted therein, a scraper for a sheeting roll, a rocker-bar on which said scraper is mounted, axially movable pivot-pins in the respective ends of said rocker-bar, spring means for normally moving said pivot-pins axially outward, bearings complemental to said pivot-pins, and finger-pieces secured to said pivot-pins extending outwardly beyond said rocker-bar whereby to move said pivot-pins axially inward for removal of said rocker-bar and scraper.

6. In a dough molding machine, the combination with a sheeting roll, of a scraper for said sheeting roll, a rocker-bar on which said scraper is mounted, an axially movable pivot-pin in said rocker-bar, spring means for normally moving said pivot-pin outwardly from said rocker-bar, a complemental bearing for said pivot-pin, means extending from said pivot-pin outside said rocker-bar for moving said pivot-pin axially, said rocker-bar provided with an arm, and adjusting means for the outer end of said arm for adjusting said scraper with relation to said sheeting roll.

7. In a dough molding machine, the combination of a drum provided with end flanges, a molding plate between said end flanges in arcuate form about the periphery of said drum, cradles about the axis of said drum at the beginning portion, at the middle portion and at the end portion of said molding plate, said cradles comprising pairs of links and cross-bars between the outer ends of the links of said respective pairs of links, the said drum being between the links of said respective pairs, rocker-disks at the respective ends of said drum, the inner ends of said links having articulating connections with said rocker-disks, said molding plate located between said cross-bars and said drum, means for positioning said middle cradle with relation to said molding plate, and releasable positioning means between said respective cross-bars and said molding plate whereby said molding plate is releasable from said cross-bars while leaving said cradles intact and maintaining said middle cradle in position.

8. In a dough molding machine, the combination of a drum provided with end flanges, a molding plate between said end flanges in arcuate form about the periphery of said drum, blocks on said molding plate extending outwardly from said molding plate, rocker-disks about the axis of rotation of said drum at the respective ends of said drum, links at the respective ends of said drum articulated at their inner ends with said rocker-disks adjacent to said axis of rotation, spanner-bars across the outer periphery of said drum, the outer ends of said links having connections with the respective ends of said spanner-bars and forming cradles about said drum, means for adjusting said rocker-disks whereby to adjust the curvature of said molding plate and its distance from the outer periphery of said drum, and means for releasably securing said molding plate to said spanner-bars arranged for removing said molding plate while leaving said cradles intact.

9. In a dough molding machine, the combination of a drum provided with end flanges, an arcuate flexible molding plate about said drum between said end flanges, intermediate links at the respective ends of said drum having connections with the middle portion of said molding plate, links at the respective ends of said drum having connections with the respective end portions of said arcuate molding plate, disks at the respective ends of said drum about the axis of rotation of said drum, pivot connections between the inner ends of said links and said disks adjacent to said axis of rotation, said links normally tangent to said disks, and stationarily positioned side contact means for said respective intermediate links whereby to position said arcuate molding plate endwise.

10. In a dough molding machine, the combination of a drum provided with end flanges, an arcuate flexible molding plate about said drum between said end flanges, intermediate links at the respective ends of said drum having connections with the middle portion of said molding plate, links at the respective ends of said drum having connections with the respective end portions of said arcuate molding plate, disks at the respective ends of said drum about the axis of rotation of said drum, pivot connections between the inner ends of said links and said disks adjacent to said axis of rotation, and end contact means for said respective intermediate links whereby to position said molding plate edgewise between said flanges.

11. In a dough molding machine, the combination of a frame, a drum in said frame, said drum provided with end flanges, an arcuate flexible molding plate about said drum between said end flanges, intermediate links at the respective ends of said drum having connections with the middle portion of said molding plate, links at the respective ends of said drum having connections with the respective end portions of said arcuate molding plate, rocker means at the respective ends of said drum, pivot connections between the inner ends of said links and said rocker means adjacent to the axis of rotation of said drum, guiding means on said frame at the respective ends of said drum for guiding said intermediate links whereby to position said molding plate about said drum, said intermediate links acting to hold the middle portion of said molding plate toward said drum, and means for adjusting said guiding means.

In testimony whereof, I have hereunto signed my name.

GEORGE W. DELL.